United States Patent [19]
Campau

[11] Patent Number: 5,832,946
[45] Date of Patent: Nov. 10, 1998

[54] LOW PROFILE BATTERY REFILL SYSTEM

[75] Inventor: Daniel N. Campau, Grand Rapids, Mich.

[73] Assignee: Flow-Rite Controls, Ltd., Grand Rapids, Mich.

[21] Appl. No.: 797,465

[22] Filed: Feb. 6, 1997

[51] Int. Cl.⁶ .......................... H01M 2/00; F16K 21/18
[52] U.S. Cl. .................. 137/15; 137/260; 429/64
[58] Field of Search ............ 137/260, 15; 429/63, 429/64, 70, 73, 80

[56] References Cited

U.S. PATENT DOCUMENTS

| | | |
|---|---|---|
| 4,353,968 | 10/1982 | Boyle ............................ 137/260 X |
| 4,386,141 | 5/1983 | Weidner et al. ............... 137/260 X |
| 4,527,593 | 7/1985 | Campau . |
| 5,048,557 | 9/1991 | Campau . |
| 5,090,442 | 2/1992 | Campau . |
| 5,284,176 | 2/1994 | Campau . |

*Primary Examiner*—Kevin Lee
*Attorney, Agent, or Firm*—Niro, Scavone, Haller & Niro

[57] ABSTRACT

A low profile battery refill system employing swiveling three-port tubing connectors, enabling a standardized routing configuration and the use of interchangeable tubing connector components.

10 Claims, 7 Drawing Sheets

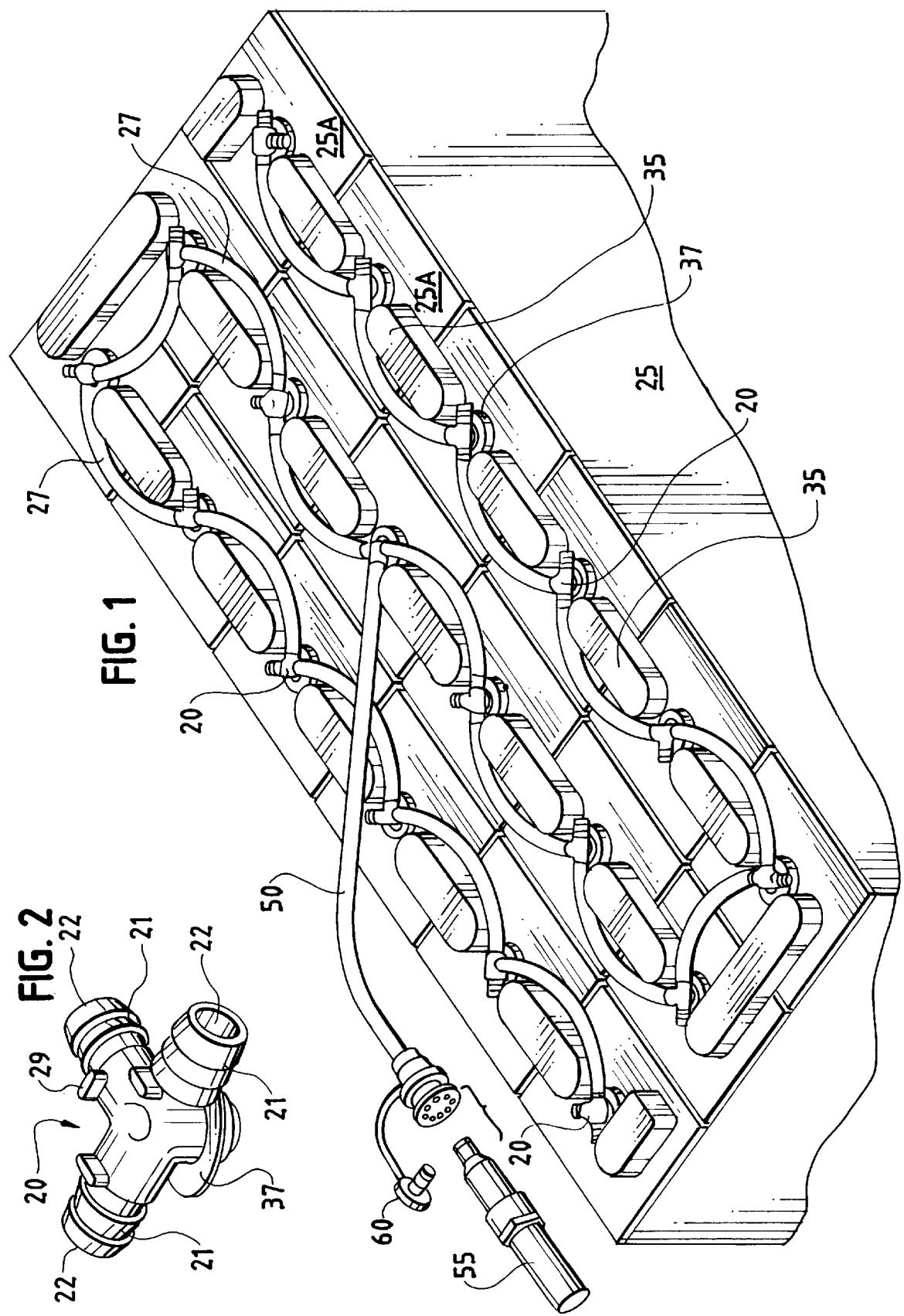

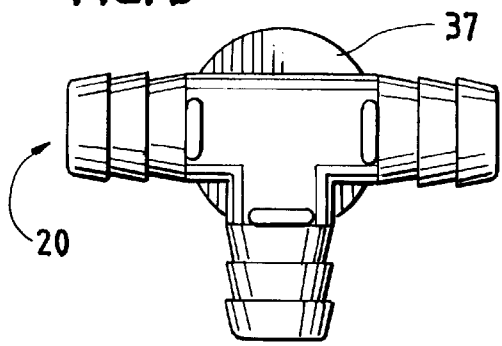
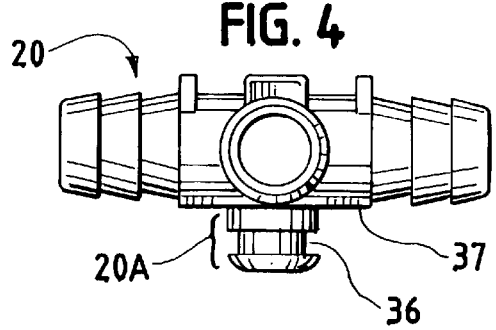
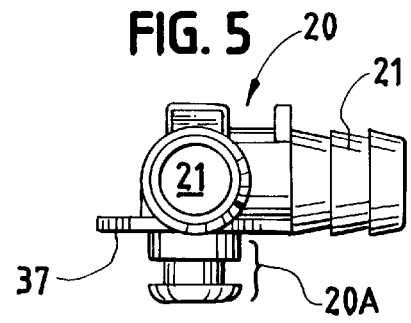
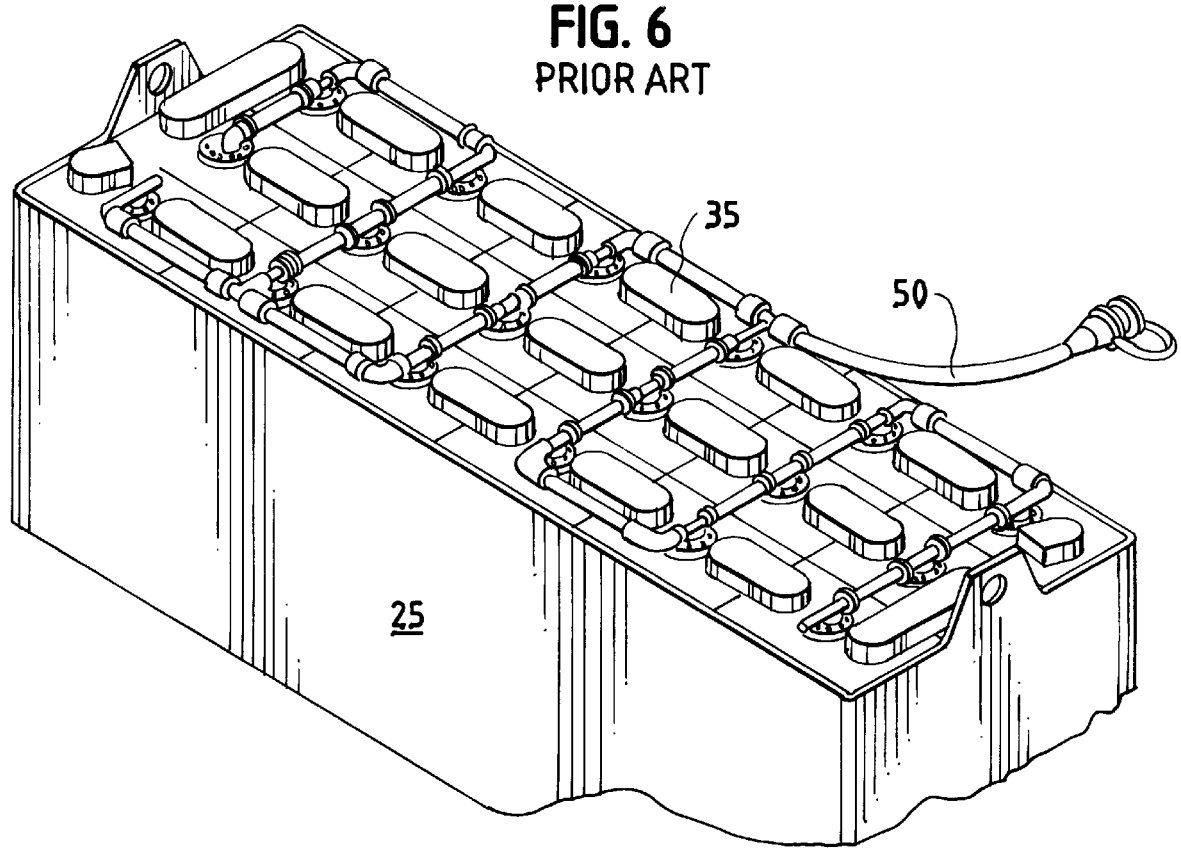

LOW PROFILE BATTERY REFILL SYSTEM

BACKGROUND OF THE INVENTION

My following patents relate generally to an apparatus and a system for filling containers with a liquid and are hereby incorporated by reference herein: U.S. Pat. Nos. 5,048,557, 5,090,442, 4,527,593 and 5,284,176. These patents disclose the use of fluidic controls which require only the static and dynamic energy of the liquid medium as a power source. The inventions find advantageous application in automated systems for simultaneously filling a number of separate containers, such as batteries or battery cells, from a single supply.

This invention is an improvement to that disclosed in my earlier patents, and relates to the connection system between the containers and the liquid source. One of the important features which distinguishes the battery refill system described in my above-referenced patents from all other competitive systems is that the valves have a "low profile" design. "Low profile" as used here means that the valves and associated tubing and fittings are located completely or substantially below the top surfaces of the battery intercell connectors. One benefit of this design feature is that the refill system has refill valves and/or tubing connectors which are protected from damage during battery handling. All other known prior art battery refill systems have refill valves and/or tubing connectors which are located well above the tops of the intercell connectors, and therefore are exposed to potential battery handling damage. Batteries can weigh over one ton and, in many applications, must be moved daily between a lift truck and a charging station. The handling equipment can include heavy overhead hoists that are swung across the top of the battery. Competitive plastic refill system components are frequently damaged by impact with these hoists. In other handling situations, the battery must be pushed manually off a truck-mounted roller tray and onto another tray at the charging station. If a valve or associated components are located either above the intercell connectors or close to the battery periphery, such movement can damage these components.

Another benefit of the low profile design is that some lift vehicles have limited clearance above the battery top. Batteries for these vehicles, equipped with competitive watering systems, frequently experience damage during the changing operation. In other cases, the battery simply will not fit into the available space when a competitive system is mounted on the battery. My low profile design addresses these problems, and enables the use of a battery watering system which can accommodate limited height clearances not possible with competitive systems.

One advantage of battery watering systems of other designs is that since the tubing is installed above the intercell connectors, the tubing can follow the electrical path defined by the intercell connectors without obstruction from the intercell connectors. This facilitates installation for installers, who can simply follow the intercell connector path to route tubing on most batteries. However, this leaves such systems vulnerable to handling damage and limits their application to situations in which there is adequate clearance above the top surface of the battery.

Until now, to realize the benefits of my low profile design, installation has been customized for each battery configuration. A number of tees and elbows have been used, along with the tubing, to route the tubing on the top surface of the battery and to avoid the intercell connectors and battery cables that also lie on the battery surface. This has required a greater level of skill on the part of the installer, and also adds to the time required to install the low profile system on each battery.

Each battery manufacturer has thousands of different battery cell layouts which require different battery refill system configurations. In addition, batteries may be 6, 9, 12, 18, 24, 30, 36, 40, 48 or 64 cells per battery. Given these variables, it can be complex to determine the best tubing routing arrangement for the many varied combinations that are possible in the field. FIGS. 7(a), 7(b) and 7(c) illustrate several typical battery cell layouts and corresponding "low profile" installation configurations of the prior art.

All known battery refill valves to date have been designed with two in-line water connection ports, so that the tubing can be connected in a continuous chain, as shown for example in FIG. 6. Some refill system manufacturers provide means to rotate either the tubing connector or the refill valve, or the connector and the refill valve together, to properly orient the connector for the required tube routing direction. Some even use a fixed relationship which prevents rotation between the connector and the valve. This works with other systems because the tubing is always routed above the battery components in the same way for all battery configurations.

BRIEF DESCRIPTION OF THE DRAWINGS

The novel features of the invention are set forth in the appended claims. However, the preferred embodiments of the invention, together with its further objects and attendant advantages, will be best understood by reference to the following description taken in conjunction with the accompanying drawings in which:

FIG. 1 is a perspective view of the top portion of a multi-celled battery employing the liquid refill system of the present invention;

FIG. 2 is a perspective view of the swivel-tee, three-port connector of the present invention;

FIGS. 3–5 are top, front and side perspective views of the three-port connector shown in FIG. 2;

FIG. 6 is a perspective view of the upper portion of a multi-celled battery employing a low profile liquid refill system of the prior art;

SUMMARY OF THE INVENTION

Figure 7A:
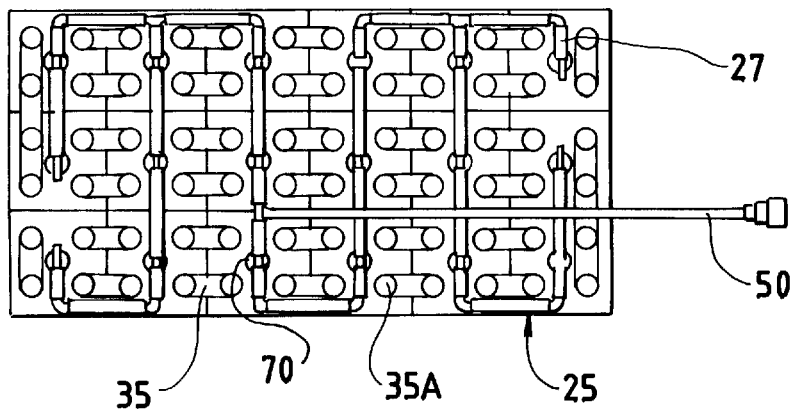
FIGS. 7(a)–7(c) are top views of three different battery cell layouts, each equipped with a "low profile" battery refill system, and with prior art tubing routing configurations.
Figure 7B:
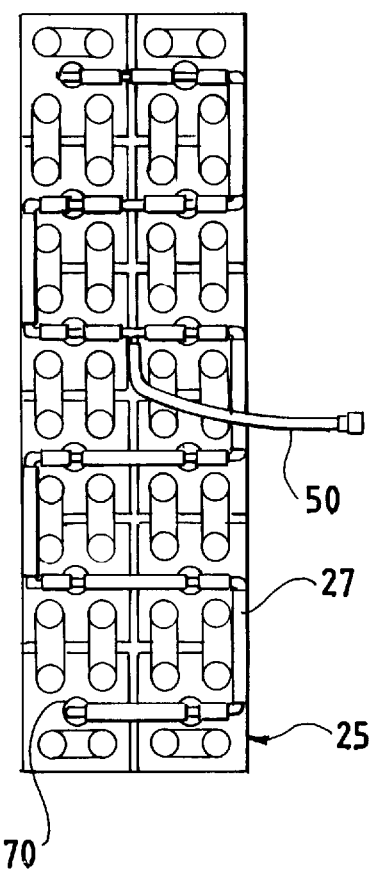
Figure 7C:
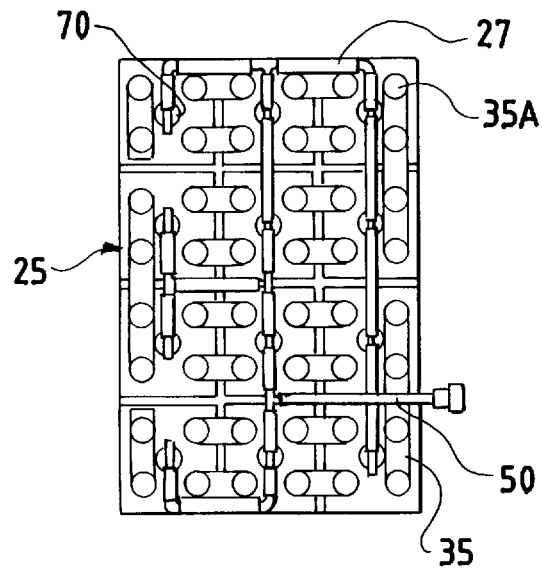
Figure 7D:
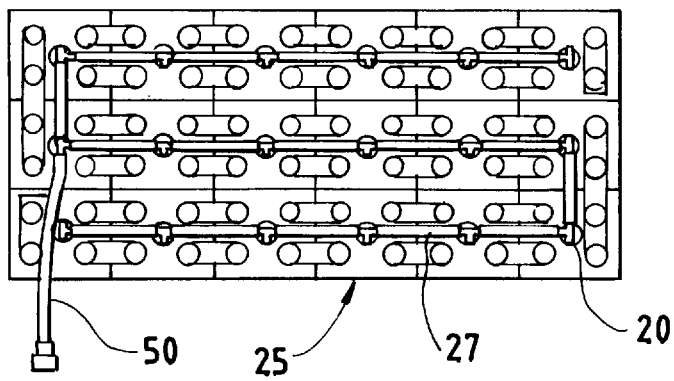
FIGS. 7(d)–7(f) are top views of the same battery cell layouts shown in FIGS. 7(a)–(c), respectively, but with "low profile" battery refill systems which include tubing routing configurations enabled by the present invention.
Figure 7E:
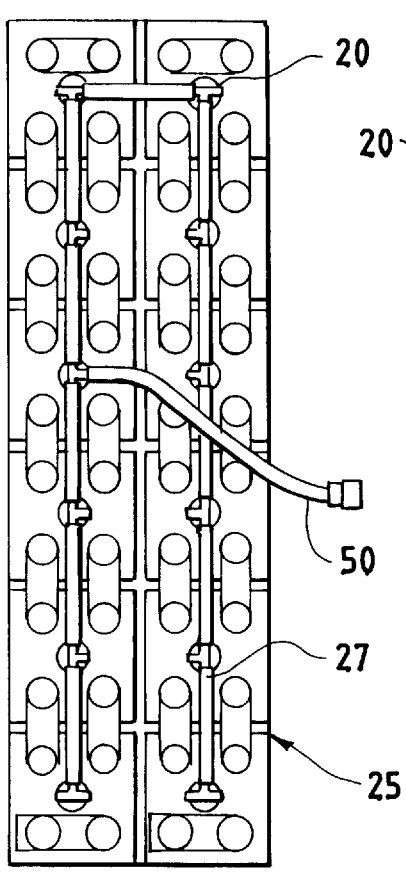
Figure 7F:
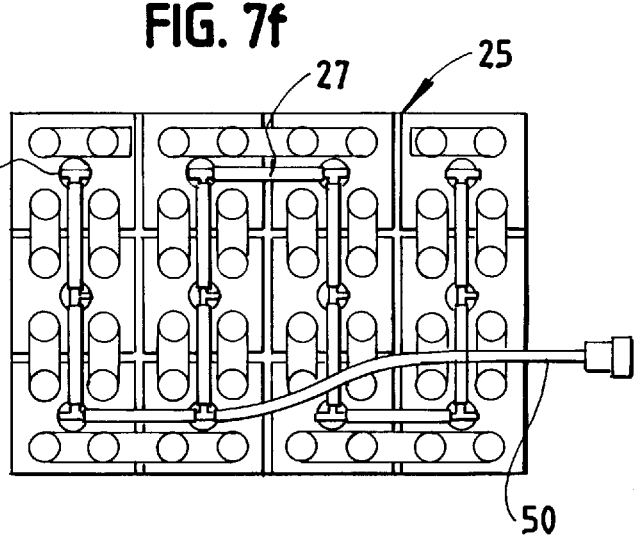
Figure 8:
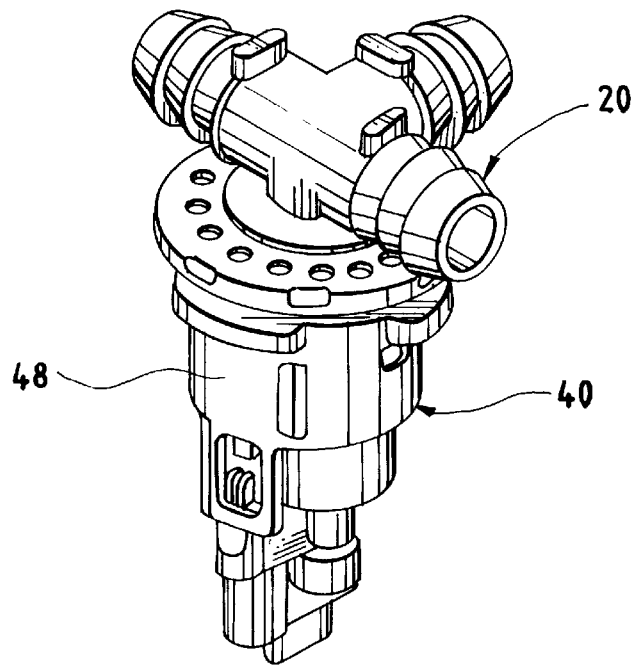
FIG. 8 is a perspective view of the tubing connector of the present invention shown attached to a battery refill valve.

The present invention preserves the advantages of low profile battery refill systems over other prior art systems, while overcoming disadvantages associated with such low profile systems.

In a preferred embodiment, a container refill system is provided for filling at least one container, such as a multi-celled battery, with a liquid, such as a liquid containing electrolytes. In the particularly preferred embodiment of a battery refill system, the system includes liquid refill valves in fluid communication with the battery cells, intercell connectors located on the top surface of the battery, and tubing in fluid communication with a liquid source. A plurality of tubing connectors are provided in fluid communication with the refill valves. Substantially all of the tubing connectors have at least three tubing connection ports. The tubing connectors may be T-shaped, with each port running at right angles to an adjacent port. Use of these tubing connectors permits the installation of a standardized tubing routing path that is independent of the battery cell configuration/layout. This standardized tubing routing path preferably generally follows the electrical path defined by the intercell connectors, so that the installer need not exercise independent judgment. Preferably, each tubing connector can be rotated or swiveled 360° about its vertical axis. In the preferred embodiment, the system is a low profile system in which the tubing connectors are located at a height below the intercell connectors. Use of this system allows the outside periphery of the top surface of the battery to be substantially free of the tubing.

By using tubing connectors which are alike and interchangeable, or at least substantially all of which are, the benefits of the present invention may be realized, and the installer need not spend extra time customizing the installation based on a particular battery cell layout, or using extra components such as elbows and tees.

In a preferred embodiment, each of the ports for each tubing connector intersects the centerline of the axis of each tubing connector at right angles, to permit the use of narrow passageways intersecting at right angles to each others. Also, the horizontal centerline of each of the ports of the tubing connectors preferably lies in approximately the same horizontal plane.

Use of the present invention permits the provision of a battery refill system with batteries of all sizes, including smaller batteries, such as those having a valve-to-valve cell spacing of less than or equal to about three inches.

A method for providing a low profile automated battery refill system also forms part of the present invention. The method involves filling at least one multi-celled battery with a liquid. The system includes liquid refill valves in fluid communication with the battery cells, intercell connectors located on the top surface of the battery, and tubing in selective fluid communication with a liquid source. A plurality of interchangeable tubing connectors is provided. Preferably at least substantially all of the tubing connectors have at least three ports. The tubing connectors are attached to the battery so that they are in fluid communication with the refill valves. Preferably, the tubing connectors are positioned below the intercell connectors. The tubing is connected to the tubing connectors so that the tubing path generally follows the electrical path defined by the intercell connectors. Any unused ports are plugged to prevent liquid flow through the unused ports.

DETAILED DESCRIPTION OF PREFERRED EMBODIMENTS

Referring first to FIG. 1, the improved battery refill system of the present invention includes the use of standardized tubing connectors, designated generally with the reference numeral 20. In the preferred embodiment, tubing connectors 20 are each identical in shape and size, and include three barbed fittings or extensions 21 forming three ports 22. Clamp rings (not shown) well known in the art pass over the extensions 21 to provide a secure connection between connectors 20 and the tubing 27. Ridges or stops 29 on the upper portion of extensions 21 seat the tubing and halt its further movement. A flared skirt 37 on connector 20 functions as a dust shield to prevent debris on the top of the battery from clogging the battery cell gas vent ports 49 (see FIGS. 10 and 13). Each extension 21 is preferably at right angles to an adjacent extension, so that tubing connector 20 is "T-shaped" when viewed from the top. Ports 22 which are not connected to tubing are simply plugged using an insert that is easily pressed into the unused connector using finger pressure.

Figure 12:
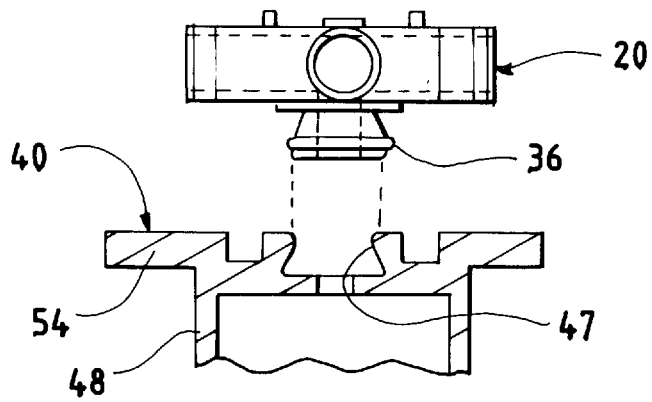
FIG. 12 is a partial, side cross-sectional view similar to FIG. 10, showing the attachment of the tubing connector to the refill valve.

In the preferred embodiment, each refill valve 40 has a single tubing connector 20 associated with it. (Battery refill valve 40 is preferably made according to my prior art patents referenced above.) Referring now to FIGS. 4, 5, 10, 12 and 13, tubing connector 20 has a boss 20A with an annular o-ring groove 36A. In the preferred embodiment shown in the drawings, tubing connector 20 is attached to refill valve 40 as follows: boss 20A and o-ring 36 provide a snap-fit attachment with recess 47A formed by walls 47 on an upper portion of refill valve 40. For this purpose, walls 47 are preferably provided with a reverse taper, as shown in FIG. 12. Of course, the specific configuration of the attachment mechanism(s) between connector 20 and valve 40 may vary. However, connector 20 is preferably attached to refill valve 40 in a manner that permits full 360° rotation of tubing connector 20 in a horizontal plane, relative to refill valve 40.

Figure 10:
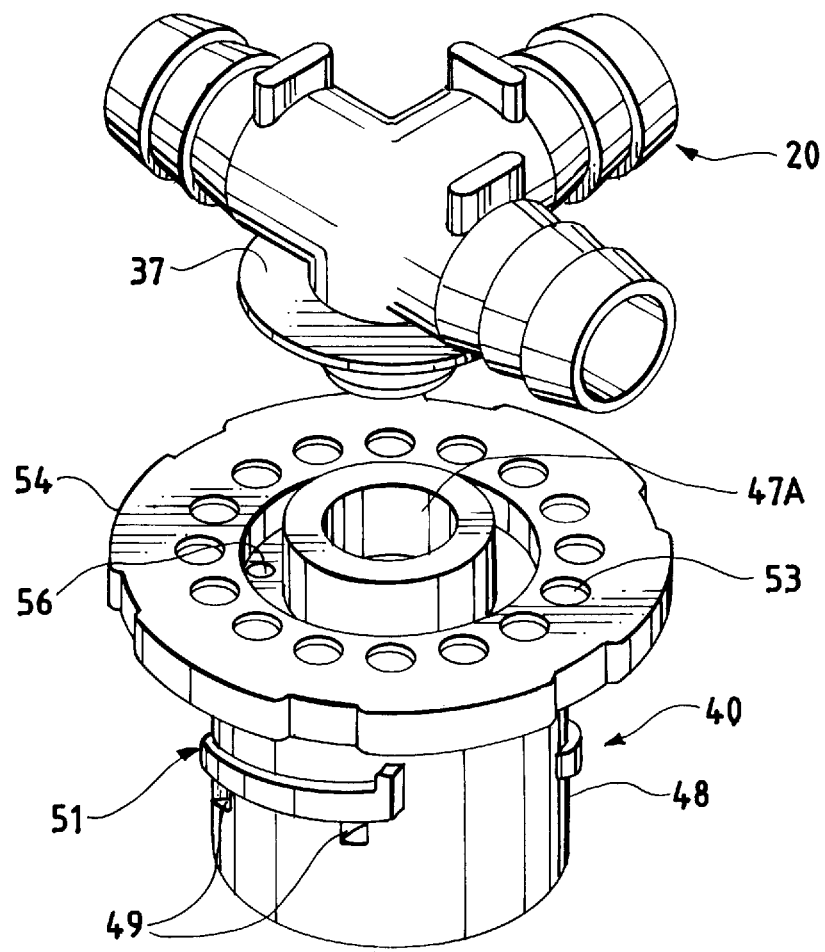
FIG. 10 is a perspective, exploded view of the tubing connector and an upper portion of the battery refill valve.
Figure 13:
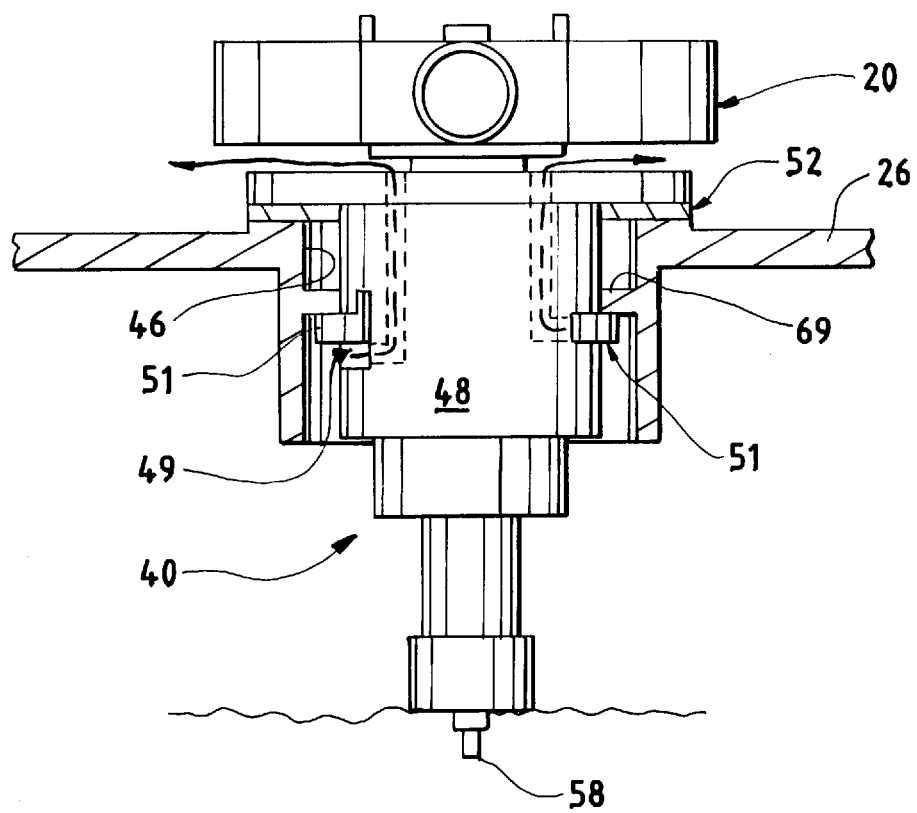
FIG. 13 is a side, cross-sectional view showing the attachment of the tubing connector/refill valve component to a battery cell.

Referring now to FIGS. 10 and 13, to connect refill valve 40 to battery 25, the battery vent cap for a particular battery cell (not shown) is removed, and lower projection 48 of refill valve 40 is inserted into battery cover vent 46. By rotating the valve (using, for example, a spanner wrench which engages spanner holes 53 on valve cap 54), bayonet lugs 51 are positioned adjacent battery cover stops 69, thereby locking valve 40 to battery cover 26. Battery cell gases are vented to the atmosphere by passing through side openings 49 in valve portion 48, and out through valve vent ports 56 (only one shown on FIG. 10) in valve cap 54, as indicated by the arrows on FIG. 13. Gasket 52 can be provided to seal any space between battery cover 26 and valve cap 54 on the upper portion of valve 40. Attachment of refill valve 40 to the battery can, alternatively, be accomplished by other means known to those of ordinary skill in the art, such as by press-fitting the valve into a corresponding opening on the top surface of the battery, or by using screw threads.

In one preferred method of operation, the operator attaches a pressurized water supply 55 to water supply tube 50, and water is permitted to flow through tubing 27 and into each battery cell 25A. Once the desired electrolyte level is reached, a sensor (not shown) may be used to cause refill valve 40 to close. A flow indicator (also not shown) may also be provided on water supply tube 50 so that the operator can see when all battery cells have been filled. The operator then disconnects the water supply and replaces dust cap 60.

The use of swiveling, three-port tubing connectors 20 with a low profile battery refill system enables the tubing routing configuration shown in FIGS. 1, 7(*d*), 7(*e*), 7(*f*) and 9. (In contrast, the prior art low profile battery refill systems shown in FIGS. 6 and 7(*a*)–7(*c*) each employ two-port swivel connectors 70.) FIG. 1, for example, illustrates an 18-cell installation on a battery 25 with oblong intercell connector covers 35, each of which surrounds two electrical intercell connectors 35A (e.g., lead bars) connected to two corresponding battery posts (not shown) which are located in each battery cell 25A. (Intercell connectors 35A are shown in FIGS. 7(*a*)–7(*c*).)

Figure 9:
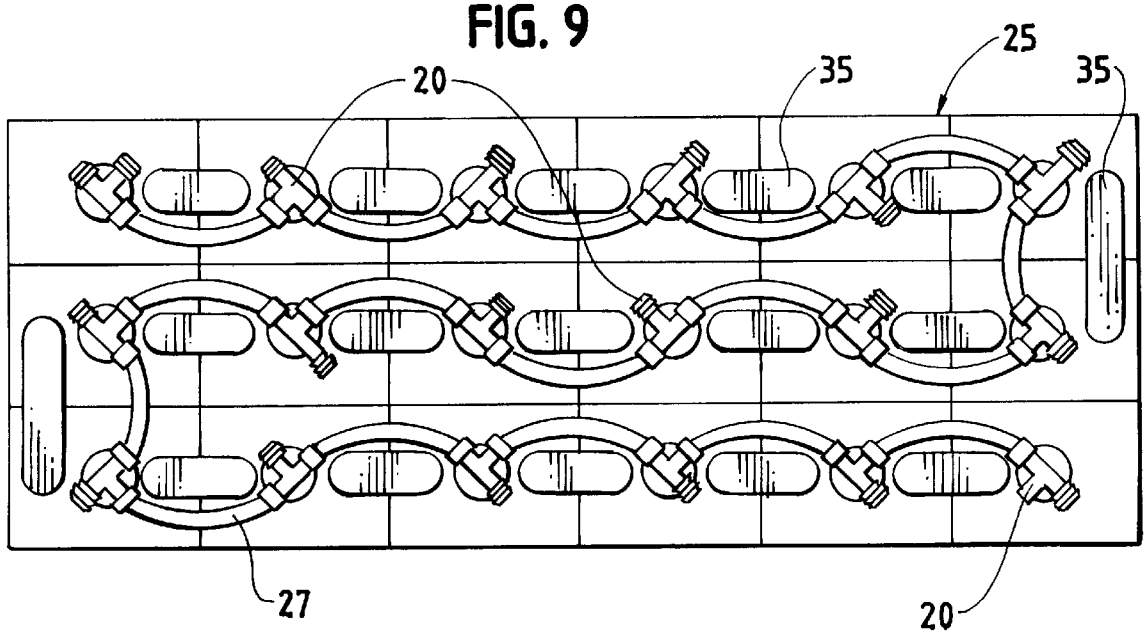
FIG. 9 is a top view of the battery and refill system shown in FIG. 1.

Referring to FIG. 9, with the routing configuration of the present invention, the tubing 27 easily curves around covers 35. As can be seen, the tubing can be routed on the inner sides of the covers 35/intercell connectors (i.e., away from the periphery of the battery), so that the outside periphery of the top surface of the battery is free of tubing to the extent permissible given the routing configuration of the present invention (defined here as "substantially free"). As an example, the routing configuration shown in FIG. 6 is not "substantially free" of tubing on the battery's outside periphery. This routing configuration of the present invention helps to keep the tubing protected and away from the edge of the battery where snagging can occur. Preferably, a tubing is used that is impervious, or nearly so, to the effects of battery acid, such as that described in my U.S. Pat. No. 5,284,176.

As shown in FIGS. 1, 7(*d*)–7(*f*) and 9, swivel connectors 20 can be directed so that tubing 27 weaves back and forth across adjacent battery cells, enabling the use of a standardized tubing routing system which simply follows the electrical path defined by the intercell connectors. The same routing is used on batteries of all sizes and layouts. This allows the use of low skilled installers who do not have to make routing decisions, and who do not have to use different tubing components. Instead, with the present invention, in addition to the refill valves, only tubing connector 20, port plugs (not shown), clamp rings (not shown) and the tubing itself need be used.

The installation system of the present invention thus employs interchangeable tubing connectors. In practice, all of the tubing connectors 20 need not be alike and interchangeable, provided that substantially all of them are. "Substantially all" is defined here as 80% of the total number of connectors used; this number is an estimate of the percentage of interchangeable connectors 20 necessary to be used to derive substantial benefits from the present invention.

While the low profile system preferably used with the present invention may be duplicated using a complicated combination of components such as swivel tee, swivel elbow and swivel-straight-through type fittings (as shown in FIG. 6), such a system would require a different combination of tees, elbows and straights for each different battery cell layout. It would also make packaging the system in kits impractical or needlessly expensive, as extra parts would have to be provided. Installation time would also be increased because the installer would have to predetermine where the various swivel fitting types were needed, and then would be required to install the appropriate fitting into each refill valve at the time of installation. This is undesirable in any case, but particularly impractical when refill systems are installed on the battery production line, where time is of the essence.

Figure 11:
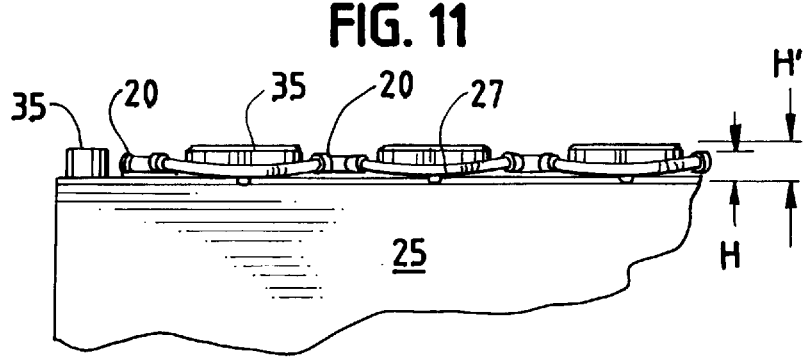
FIG. 11 is a partial side view of portions of a battery and the battery refill system of the present invention.

It will be recognized that the present system avails itself of the advantages of a "low profile" battery refill system, since the tubing 27 can still be routed below the top of the intercell connectors, as best shown in FIG. 11. In FIG. 11, the height of covers 35 is indicated by H', while the height of swivel connectors 20 is indicated by H. Now, however, the tubing can also be routed in the same path as the electrical path defined by the intercell connectors so that the tubing routing path is the same on all batteries and immediately apparent to the installer. This greatly reduces the skill and experience level required of installation personnel. Installation can be done at substantial time and material savings compared to prior art low profile systems. Importantly, the reliability of the refill system is significantly enhanced because of the simplified and standardized installation procedure.

Another advantage of the present invention is that the tubing configuration resulting from the use of connectors 20 provides multiple locations to connect the water supply or inlet tube(s). Also, the low profile battery refill system enabled by the present invention can be advantageously employed with even the smallest of batteries (e.g., batteries with a two-inch valve-to-valve cell spacing) without kinking of the tubing.

Of course, it should be understood that various changes and modifications to the preferred embodiments described herein will be apparent to those skilled in the art. For example, more than three extensions 21 may be used with connectors 20 and/or the extensions 21 maybe inclined at angles other than right angles. Such modifications and changes can be made to the illustrated embodiments without departing from the spirit and cope of the present invention, and without diminishing the attendant advantages. It is, therefore, intended that such changes and modifications be covered by the following claims.

I claim:

1. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and the standardized tubing routing path generally follows the electrical path defined by the intercell connectors.

2. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and the outside periphery of the top surface of the battery is substantially free of the tubing.

3. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and each of the ports intersect the centerline of the axis of each tubing connector at right angles.

4. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and the routing path of the tubing attaching the plurality of tubing connectors generally follows the electrical path defined by the intercell connectors.

5. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and each tubing connector is generally T-shaped.

6. A battery refill system for filling at least one multi-celled battery with a liquid, the system including refill valves in fluid communication with the battery cells, intercell connectors located on the top surface of the battery, and tubing in fluid communication with a liquid source, comprising:

a plurality of tubing connectors in fluid communication with the refill valves, substantially all of the tubing connectors having at least three tubing connection ports, such that the use of the tubing connectors permits the installation of a standardized tubing routing path independent of the battery cell configuration and at least one multi-celled battery has a valve-to-valve cell spacing of less than or equal to about three inches.

7. A method for providing an automated battery refill system for filling at least one multi-celled battery with a liquid, the system having liquid refill valves in fluid communication with the battery cells, intercell connectors located on the top surface of the battery, and tubing in selective fluid communication with a liquid source, comprising the steps of:

a. providing a plurality of interchangeable tubing connectors, substantially all of the tubing connectors having at least three ports;

b. attaching the tubing connectors in a manner that permits the tubing connectors to be in fluid communication with the refill valves; and c. connecting the tubing to the tubing connectors so that the tubing path generally follows the electrical path defined by the intercell connectors.

8. The method for providing a battery refill system of claim 7, wherein the system is a low profile system and the tubing connectors are positioned below the intercell connectors.

9. The method for providing a battery refill system of claim 7, further comprising the step of plugging those ports not attached to the tubing to prevent liquid flow through the unused ports.

10. A battery refill system for filling a multi-celled battery with a liquid, said multi-celled battery having a plurality of refill valves, said system comprising:

a plurality of tubing connectors in fluid communication with said refill valves, each tubing connection having a first tubing connection port, a second tubing connection port, and an auxiliary port adapted to selectively receive a fluid inlet hose connected to an external fluid source; and a plurality of tubing sections mounted to at least one of said first and second connection ports of each tubing connector, such that said tubing connectors are in fluid communication with each other.

* * * * *